United States Patent
Ibrahim et al.

(10) Patent No.: US 9,524,431 B2
(45) Date of Patent: Dec. 20, 2016

(54) LOCAL MAPS USING TILES

(71) Applicant: Google Inc., Mountain View, CA (US)

(72) Inventors: Ammar Ibrahim, Zurich (CH); Pascal Corpet, Gockhausen (CH); Patrick Pui Wah Leung, Paris (FR); Robert Allen Ryskamp, Mountain View, CA (US); Christopher John Digiano, Saint Mandé (FR); Iyad F. I. Assad, Ruschlikon (CH)

(73) Assignee: Google Inc., Mountain View, CA (US)

( * ) Notice: Subject to any disclaimer, the term of this patent is extended or adjusted under 35 U.S.C. 154(b) by 203 days.

(21) Appl. No.: 13/728,790

(22) Filed: Dec. 27, 2012

(65) Prior Publication Data

US 2015/0169976 A1  Jun. 18, 2015

(51) Int. Cl.
*G06K 9/00* (2006.01)

(52) U.S. Cl.
CPC .................. *G06K 9/00476* (2013.01)

(58) Field of Classification Search
CPC .................................. G06K 9/00476
See application file for complete search history.

(56) References Cited

U.S. PATENT DOCUMENTS

| | | | |
|---|---|---|---|
| 2007/0219759 A1* | 9/2007 | Ghazali | E04H 1/005 703/1 |
| 2009/0208098 A1* | 8/2009 | Yang | G06T 1/60 382/164 |

OTHER PUBLICATIONS

ESRI GIS Mapping Software, Solutions, Services, Map Apps, and Data, The National Map—Transportation example, http://www.arcgis.com/home/webmap/viewer.html?webmap=8924f1d54c9c47c4bf692f11013cf28d, Jun. 30, 2011.*
ESRI GIS Mapping Software, Solutions, Services, Map Apps, and Data, Congressional Districts example, http://www.esri.com/software/arcgis/take-a-look-at-web-maps, Jun. 30, 2011.*
ESRI GIS Mapping Software, Solutions, Services, Map Apps, and Data, The Great American Commute example, http://storymaps.esri.com/stories/2014/commuting/, Jun. 30, 2011.*
Castells blog, Apr. 4, 2012, https://jcastellssala.wordpress.com/2012/04/04/playing-with-tilemill/.*
"GEOS:geos::operation::polygonize::Polygonizer Class Reference" Jun. 11, 2006, <http://geos.refractions.net/ro/doxygen_docs/html/classgeos_1_1operation_1_1polygonize_1_1Polygonizer.html>.
"Population Estimates 2009 Maps—U.S. Census Bureau" Dec. 8, 2011, <www.census.gov/popest/data/maps/2009/CBSA-Fig1a_2009.html>.
"Monterey County Home Prices and Heat Map" Trulia.com <www.trulia.com/home_prices/California/Monterey_County-heat_map>, visited Apr. 10, 2013.

* cited by examiner

*Primary Examiner* — Barry Drennan
*Assistant Examiner* — Diana Hickey
(74) *Attorney, Agent, or Firm* — Dority & Manning, P.A.

(57) ABSTRACT

A method includes identifying a plurality of linear geographic dividers for a region, wherein the plurality of linear geographic dividers comprises one or more of streets, railways, electrical lines or rivers, determining a set of logical geometric blocks for the region, based on the identified plurality of linear geographic dividers and generating one or more tiles based at least on the plurality of linear geographic dividers and the determined logical geometric blocks.

18 Claims, 6 Drawing Sheets

LOCAL MAPS USING TILES

BACKGROUND

Online maps of large regions such as countries or continents are easy to standardize because there are country or continent borders that are easy to define. However, it is difficult to standardize local maps (e.g., city maps, county maps) because there are no consistent or definite boundaries. Some emerging markets may not have definite boundaries or official, local area divisions. Zip codes may be used, where available, however, local maps divided according to zip codes may produce segments that are too large.

SUMMARY

The subject disclosure relates generally to maps, and more particularly to generating tiles and displaying the generated tiles over a map of a region.

The subject disclosure relates to a computer-implemented method that includes determining a set of logical geometric blocks for a region, identifying a plurality of linear geographic dividers for each determined logical geometric block in the region and generating one or more tiles based at least on the determined logical geometric blocks and the plurality of linear geographic dividers.

These and other aspects may include one or more of the following features. The method may also include generating one or more tiles based on one or more of a region size, region population density, or region geography. The method may likewise include displaying the one or more generated tiles over a map of the region. The plurality of linear geographic dividers may include one or more of streets, railways, electrical lines or rivers.

The method may still further include comparing the one or more generated tiles to a tile size threshold. In a case a tile of the one or more generated tiles is larger than the tile size threshold a generated tile may be split. In a case a tile of the one or more generated tiles is smaller than the tile size threshold, another tile that is smaller than the tile size threshold may be identified and the tiles may be merged. The another identified tile may be adjacent to the generated tile that is smaller than the tile size threshold. The tile size threshold may be predetermined. Alternatively, the tile size threshold may be determined in real time, based on an average size of the one or more generated tiles. The one or more generated tiles may then be compared to a layout principle.

The present disclosure also relates to a system that includes a geographic block determination module, configured to determine a set of logical geometric blocks for the region, a geographic dividers module, configured to identify a plurality of linear geographic dividers for each determined logical geometric block in the region and a tiles module, configured to generate one or more tiles based at least on the determined logical geometric blocks and the plurality of linear geographic dividers.

These and other aspects may include one or more of the following features. The geographic block determination module may be further configured to determine the set of logical geometric blocks based on one or more of a region size, region population density, or region geography.

The system may also include a tile modification module, configured to split one or more of the generated tiles, when a generated tile is larger than a tile size threshold. As an example, when a long shore line such as, for example, Ipanema beach in Rio De Janeiro, Brazil is considered, the shoreline may automatically be split into blocks due to size thresholds. A shoreline often does not have natural boundaries that run perpendicular to the water, so the size thresholds may help to separate a long shoreline into blocks. The tile modification module may be further configured to merge one or more of the generated tiles, when a generated tile is smaller than the tile size threshold.

The system may further include a display module, configured to display the one or more generated tiles as tiles over a map of the region.

The system may also include a layout module, configured to compare the one or more generated tiles to a layout principle.

The present disclosure further relates to a machine-readable medium comprising instructions stored therein, which when executed by processors, cause the processors to perform operations that include identifying a plurality of linear geographic dividers for a region, wherein the plurality of linear geographic dividers comprises one or more of streets, railways, electrical lines or rivers, determining a set of logical geometric blocks for the region, based on the identified plurality of linear geographic dividers and generating one or more tiles based at least on the plurality of linear geographic dividers and the determined logical geometric blocks.

These and other aspects may include one or more of the following features. The operations may further include displaying the one or more generated tiles over a map of the region.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

In the following detailed description, numerous specific details are set forth to provide a full understanding of the present disclosure. It will be apparent, however, that the implementations of the present disclosure may be practiced without some of these specific details. In other instances, structures and techniques have not been shown in detail so as not to obscure the disclosure.

Methods and systems for tiling local maps are provided herein. According to an aspect of the disclosed technology, streets are used as tile borders to segment a city, county, or block into substantially even-sized tiles. A tile, as used herein, is a flat shape consisting of straight, semi-straight or curved lines that are joined to form a closed chain.

Such area division produces tiles that are locally relevant in any place in the world. Depending on a given region, tiles may be made by using large streets such as highways or other major streets. Other linear geometries may be added, where appropriate. For example, railways, rivers, sea coast, electrical lines, etc. The tiles may represent small, local areas which may not otherwise be individually captured on a map. For example, if a given region represents a small district or neighborhood in a city, typical map data for the district or neighborhood would not capture the blocks represented by the tiles.

Once a region is tiled, data may be gathered from territories covered by the tiles and clustered, according to the tiles. Tiles of a region may then be referenced by latitude and longitude coordinates. Alternatively, for each tile, coordinates of neighboring tiles may be cross-referenced, and the neighboring tiles may be displayed as a result of a particular tile being requested.

Figure 1:
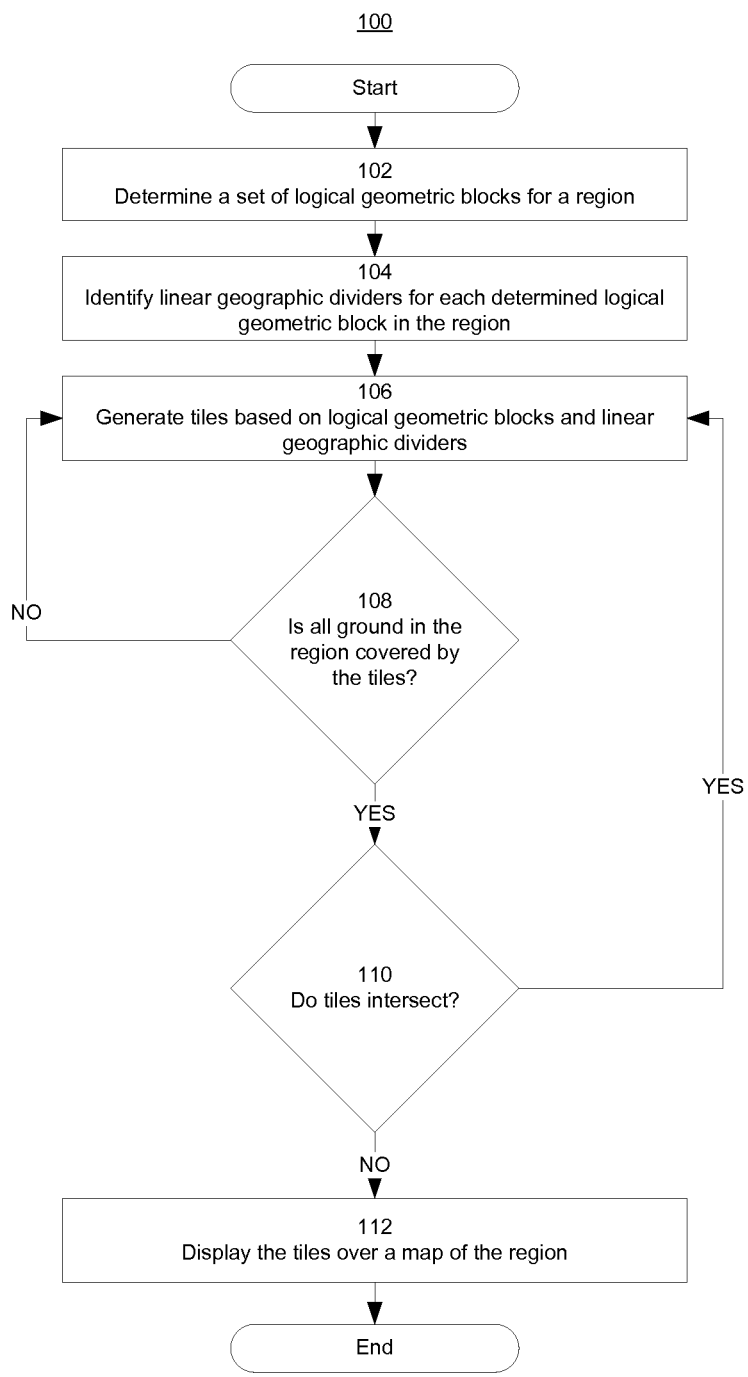
FIG. 1 illustrates a flow diagram of an example process for tiling a map of a region.

FIG. 1 illustrates a flow diagram of an example process 100 for tiling a map of a region. Process 100 may be performed, for example, by the system discussed below which may be hosted at server 410 of FIG. 4. The process 100 starts and at block 102, a set of logical geometric blocks is determined for a given region. The given region may be the entire world or a specific region such as, for example, a continent, a country or a state. The logical geometric blocks are determined based on coordinates, rather than on any specific geography. The coordinates may serve as geometric boundaries generated by a mathematical formula and unrelated to any world or geographical features. The blocks are used as a basis for determining tiles, thus the blocks are larger in size than the resulting tiles. For example, such logical geometric blocks may be 100 times larger than tiles resulting from the division of such blocks, as discussed below.

Once the logical geometric blocks are determined, linear geographic dividers are identified at block 104 for each logical geometric block in the region. In other words, the system collects data pertaining to all the linear geographic dividers that are fully or partially covered by the determined logical geometric blocks. The linear geographic dividers may intersect the logical geometric block or be fully contained therein. Borders of the logical geometric blocks may be considered as linear geographic dividers. That is, blocks' borders, in addition to geographical features (e.g., country borders, states, water bodies and roads that touch the blocks) are collected. For identified linear geographic dividers with too many segments (i.e., more than a predefined threshold) such as, for example, border of countries, the identified linear geographic dividers are split, according to an aspect of the disclosed technology. For each block, segments that are partially or fully covered by the block are processed.

Linear geographic dividers are split on intersection into segments that run from an intersection to another intersection, and the resulting segments do not intersect each other. The intersections may be road intersections, intersections between bodies of water, country or state borders, roads or bridges. Tiles are created from such segments, as discussed with reference to block 106, below.

As used herein, "linear geographic dividers" include various line forms including, but not limited to, straight, semi-straight, jagged or curved lines, for example. The "lines" need not be straight or uniform in length or width. To that end, a survey of the street, river, railway or electrical lines may be referenced to identify the "lines" that may be utilized as linear geographic dividers for each logical geometric block. Any kind of line or geometric line network may be used as a linear geographic divider. The "lines" are used as borders or boundaries for each determined logical geometric block. The geographic dividers that are identified are those that, either intersect a block, or touch a block or a block boundary.

Based on the linear geographic dividers and the logical geometric blocks, tiles are generated at block 106. In other words, the system computes tiles that are delimited by the linear geographic dividers. To that end, the system computes intersections between the linear geographic dividers, breaks the linear geographic dividers into linear segments that go from one intersection to another, and removes the ones that are not connected to a border either directly or through other segments. The system generates the tiles from such computed segments. According to an aspect of the disclosed technology, a dual graph may be used in computing adjacent tiles. Adjacent tiles from different blocks may form part of the same graph. According to an aspect of the disclosed technology, tiles that are not part of the original block may be removed from the graph. When a block's borders are used as linear geographic dividers, each tile is either in the block or outside the particular block, thus ensuring that, no tiles intersect and that the entirety of a block is covered.

Thus, a given block is divided into a set of substantially uniform tiles. All of the ground in the given region is covered by the tiles, yet no tiles intersect. In one example, the lines that are used as linear geographic dividers may be sorted based on their size. Thus, when streets are used as a linear geographic divider, larger streets such as highways may be used for larger tiles and smaller streets such as local roads may be better used for smaller tiles. Furthermore, the tiles may be of any shape, including circles.

The tiles may be based on city blocks, neighborhoods, cul-de-sacs, communities, surrounding landscapes, surrounding real estate, etc. Topographic boundaries may also be taken into account when calculating the tiles. Geographic information and municipal lines, when available, may also be consulted The size, positioning, and shape of the tiles may be different. That is, there may be different geographic limits, depending on the size, population density or geography of the region. To that end, population demographics may also be taken into account when determining the tiles. For example, for Manhattan, N.Y., a tile may be a two block area, whereas in Ohio, a tile may be an area of 15-20 miles. In Colorado, U.S., a region known to be mountainous, tiles may depend on the geography of the mountains, rivers, and road access.

According to an example, it may be implemented that a tile falls entirely on one side of a lake, river, or sea, rather than cover multiple shores of a body of water. Furthermore, the body of water itself, may or may not fall into the tile, depending on implementation. The size of the body of water may also be taken into account, when the tiles are determined, to better tile a region.

At block 108, the system may dispatch a query to confirm whether the generated tiles cover all of the ground in the given region. No ground should be left between the boundaries of the various tiles. However, as previously discussed, according to one aspect, bodies of water or land surface anomalies such as mountains, forests, etc. may be excluded from tiles. That is, tiles may be generated such that the tile boundaries track a perimeter around the body of water or certain land surface anomaly. If any ground in the region that is not expressly excluded from being covered by a tile is not covered by any of the generated tiles, the system may repeat the process described at block 106, until the query is satisfied.

Figure 3:
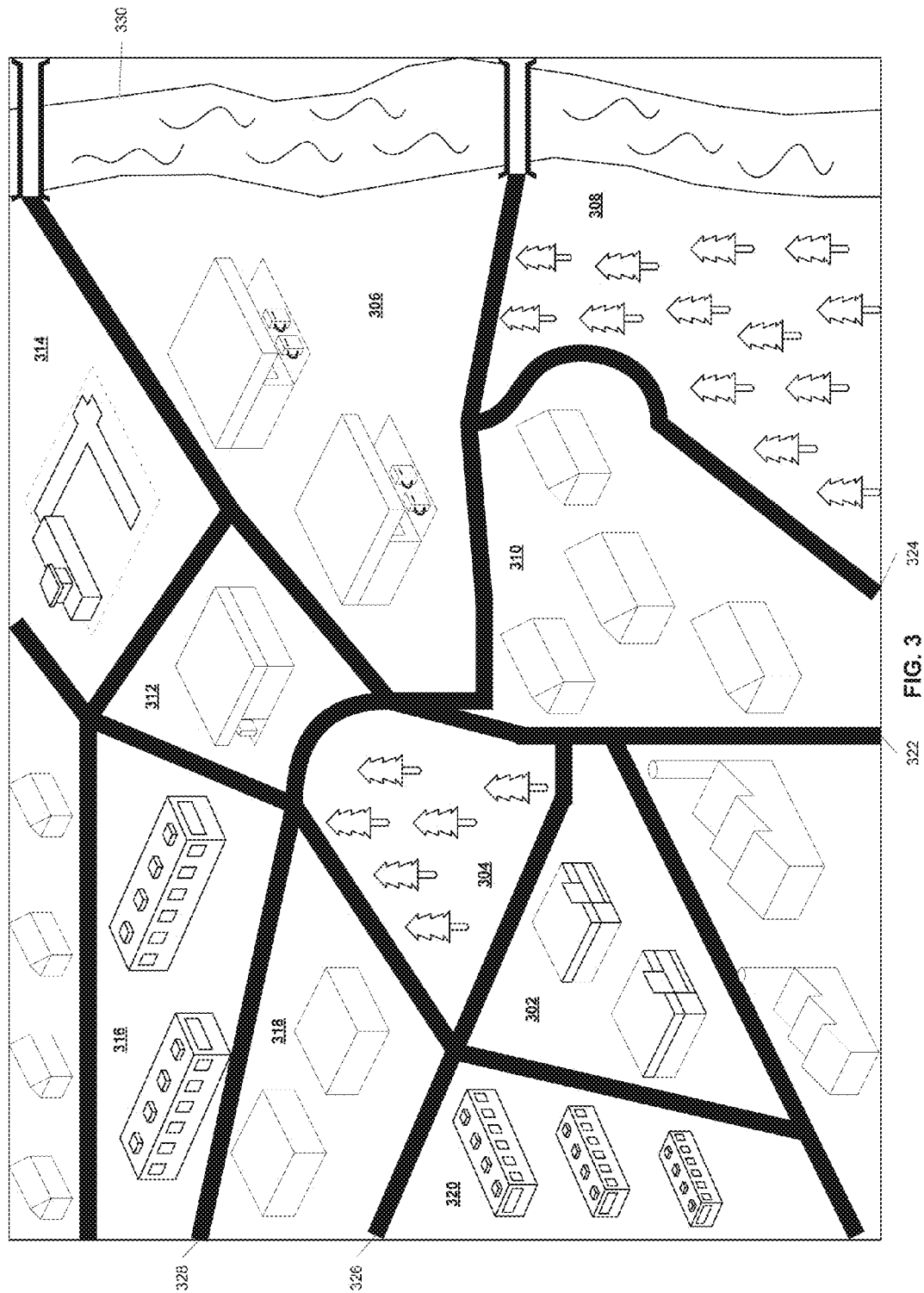
FIG. 3 illustrates an example map of a region according to an aspect of the disclosed technology.

When it is confirmed that all of the ground is covered, the system may dispatch another query to confirm whether any of the tiles intersect, at block 110. According to an aspect of the disclosed technology, the tiles do not intersect. If any of the tiles intersect, the system repeats the process described at block 106 until the query is satisfied. When the system confirms that none of the tiles intersects, the system proceeds to block 112 and displays the tiles as tiles over a map of the region, as illustrated in FIG. 3, which shows a tiled map of a region.

According to an aspect of the subject disclosure, in order to obtain uniformly sized tiles, the tiles may be split, when they are too large, or merged, when too small. To that end, each tile may be compared to a tile size threshold. When a tile is smaller than the tile size threshold, the system identifies another tile and merges the tiles together. When merging tiles, the system looks at nearby or adjoining tiles as candidates for merging. The system may generate a dual graph of the generated tiles to associate each tile with its adjacent tiles, to merge the tiles that are small. For example, the system may determine whether there is an adjoining tile with which the tile that is too small may be merged. Alternatively, the system may determine whether it is feasible to merge a tile that is too small with an adjoining tile that is of acceptable size and make retroactive adjustments to the sizes of other tiles, in response to the merge. That is, if the resulting tile is too large, the resulting tile may be split to better conform to the tile size threshold. The system may also be tuned to merge the smallest tiles, first, and a ripple effect may be created that causes changes to other tiles. Another criterion that may be used in merging tiles is the final shape of the tile.

In one example, it may be implemented that resulting tiles look more like circles or squares, rather than very long, narrow rectangles. Furthermore, according to one example, when merging tiles, tiles on the same side of an anomaly such as a body of water or a mountain, or a linear geographic divider such as a large highway or a bridge, are merged with tiles on the same side of the anomaly or divider, rather than tiles on the other side of the anomaly or divider. All such changes, however, heed the logical boundaries determined by the system and the linear geographic dividers. When a tile is larger than the tile size threshold, the system may split the tile into two or more tiles of acceptable size.

The tile size threshold may be predetermined. Alternatively, it may be determined in real time, based on an average size of the generated tiles for the region. The merging and splitting of tiles may further include determining whether a tile is too long or too wide, as compared to its neighboring tiles. That is, the system aims to generate evenly sized tiles, avoiding shapes that are too long, too short, too wide or too narrow.

Additionally, tiles may be compared to a tile layout convention. For example, tiles that are intersected by an anomaly such as, for example, a mountain, highway or railroad may be modified to continuously run along the same side of the anomaly, rather than cross the anomaly.

Figure 2:
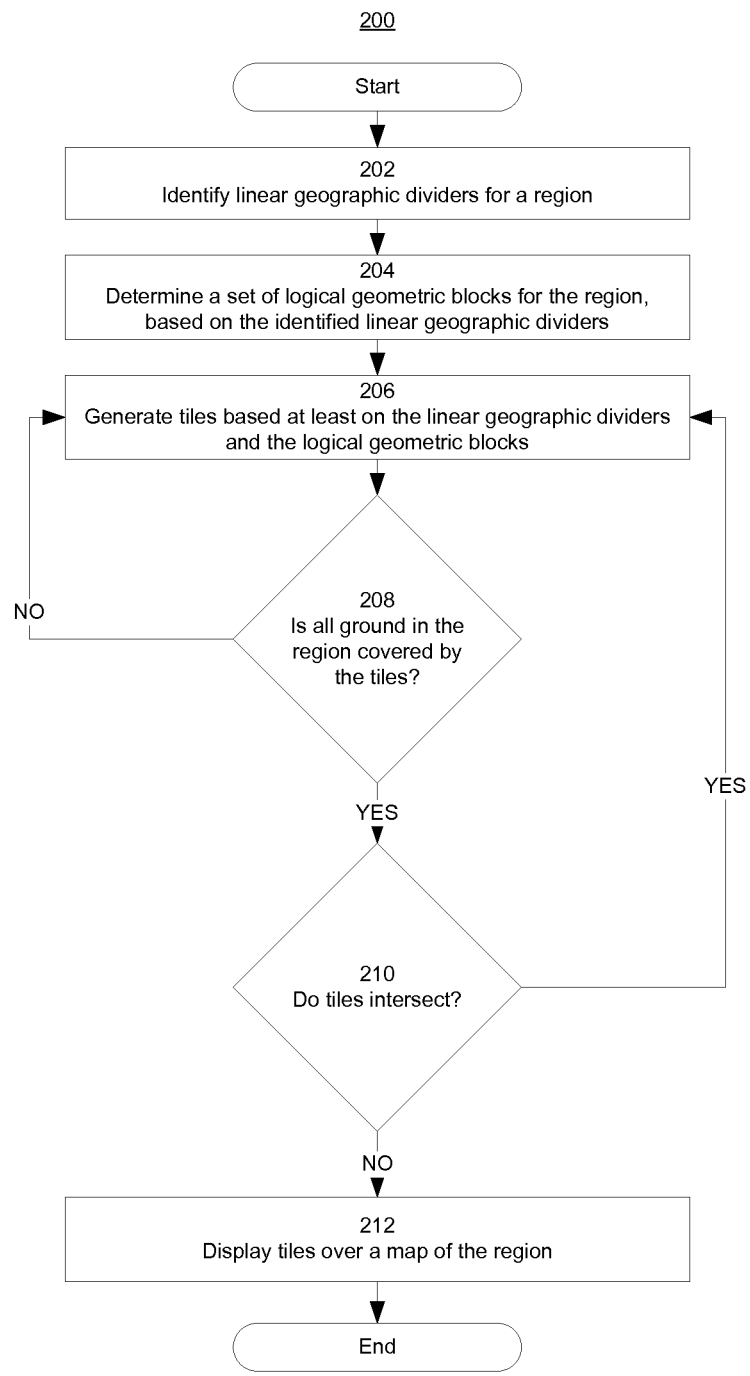
FIG. 2 illustrates a flow diagram of an example process for tiling a map of a region.

FIG. 2 illustrates a flow diagram of an example process 200 for tiling a map of a region. Process 200 may be performed, for example, by the system discussed below which may be hosted at server 410 of FIG. 4. Process 200 begins and at block 202, the system identifies linear geographic dividers for a given region. As discussed previously, with reference to FIG. 1, the linear geographic dividers may be streets, roads, highways, rivers, railways or electrical lines. Any kind of line or geometric line network may be used as a linear geographic divider. To that end, a record of the linear geographic dividers in a given region may be accessed. Such record may be stored in data store 414. Alternatively, a survey may be done of the linear geographic dividers, when a record is not available. Various satellite and municipal data may be referenced for compiling such a record. The record may be a list of the dividers or "lines" and may be in a form of a graph that reflects various edges and intersections.

At block 204, a set of logical geometric blocks is determined for the given region, based on the identified linear geographic dividers. To that end, given an input of the "lines" identified in block 202, a system algorithm determines the geographic blocks touched by the lines. The "lines" may be divided when consisting of too many segments. The borders of the logical geometric blocks are added to the linear geographic dividers.

At block 206, tiles are generated based at least on the linear geographic dividers and the logical geometric blocks. In other words, a closed chain of linear geographic dividers is created, which encloses a tile. A segment of a linear geographic divider may border two or more tiles, however, the tiles do not overlap and all ground in the given region is covered by the tiles. A new map of the given region is created (see FIG. 3) that depicts the tiles built from the lines identified at block 202.

After the tiles are generated, the system may dispatch a query to confirm that all ground in the given region is covered and that the tiles do not intersect. Once both conditions are confirmed, the system displays the tiles as tiles on a map of the region, as shown in FIG. 3, below.

FIG. 3 illustrates an example map of a region according to an aspect of the disclosed technology. FIG. 3 shows tiles 302, 304, 306, 308, 310, 312, 314, 316, 318, and 320. FIG. 3 also shows roads 324, 326, and 328, which server as boundaries of the various tiles. Body of water 330 also serves as a boundary for tiles 306 and 308. All of the tiles are of substantially similar size and shape. As can be appreciated from the illustrated map, the map covers a small region, which may be a small town or a district or neighborhood within a town. The roads 324, 326 and 328 serve as boundaries for the various tiles which are formed. None of the tiles intersects another tile, and all of the ground in the region is covered by the tiles. The body of water 330 serves as a boundary for the tiles adjacent to it. As discussed earlier, roads, highways, and geographic dividers may serve as the linear dividers.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing display. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
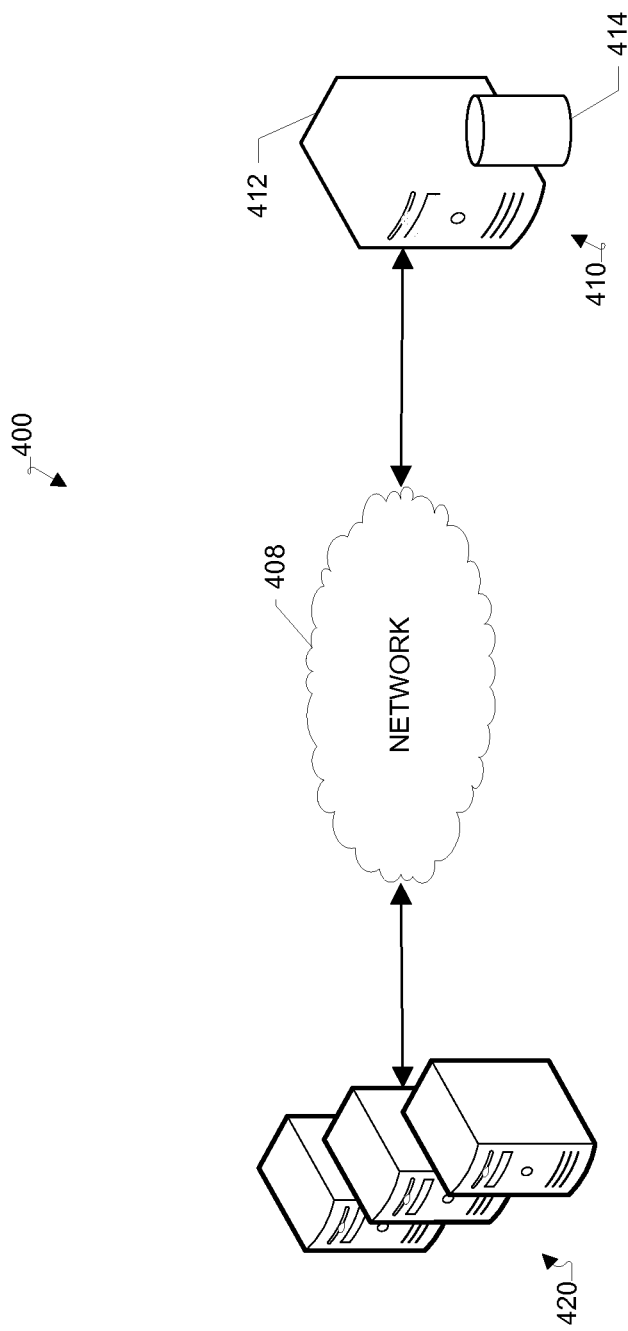
FIG. 4 conceptually illustrates an example network for tiling a map of a region.

FIG. 4 illustrates an example network that provides for tiling a map of a region. A network 400 includes a server 410 and an applications server 420, communicably connected by a network 408. Server 410 includes a processing device 412 and a data store 414. Processing device 412 executes computer instructions stored in data store 414, for example, instructions to identify a plurality of linear geographic dividers for a region, wherein the plurality of linear geographic dividers comprises one or more of streets, railways, electrical lines or rivers, determine a set of logical geometric blocks for the region, based on the identified plurality of linear geographic dividers, generate, according to a tile size threshold, one or more tiles based at least on the plurality of linear geographic dividers and the determined logical geometric blocks and display the one or more generated tiles as tiles over a map of the region.

Data store 414 may store information pertaining to, for example, region topography, local geographic data, linear geographic dividers, geographic anomalies, etc. Applications server 420 may host an application within which some of the processes discussed herein are implemented. Applications server 420 may perform some of the calculations discussed herein, alone or together with server 410. Specifically, applications servers 420 may perform the tasks associated with generating tiles based on logical geometric blocks and linear geographic dividers. The system (e.g., hosted at server 410), may also determine whether all ground is covered by a generated tile and whether any of the tiles intersect. The system may also determine whether any of the generated tiles needs to be merged or split. In some example aspects, server 410 can be a single computing device such as a computer server. In other implementations, server 410 can represent more than one computing device working together to perform the actions of a server computer (e.g., cloud computing).

According to one aspect, the subject technology may comprise a system for tiling a map of a region. The system may be hosted at server 410, for example, and include a processor. The processor may be configured to execute one or more algorithms, e.g., a query algorithm. In one example, the query algorithm may also determine whether a tile intersects with another tile and whether all of the ground in a given region is covered by tiles. The query algorithm may comprise one or more algorithms, which may perform one or more of the operations associated with the disclosed technology.

The network 408 can include, for example, any one or more of a personal area network (PAN), a local area network (LAN), a campus area network (CAN), a metropolitan area network (MAN), a wide area network (WAN), a broadband network (BBN), the Internet, and the like. Further, the network 408 can include, but is not limited to, any one or more of the following network topologies, including a bus network, a star network, a ring network, a mesh network, a star-bus network, tree or hierarchical network, and the like.

Figure 5:
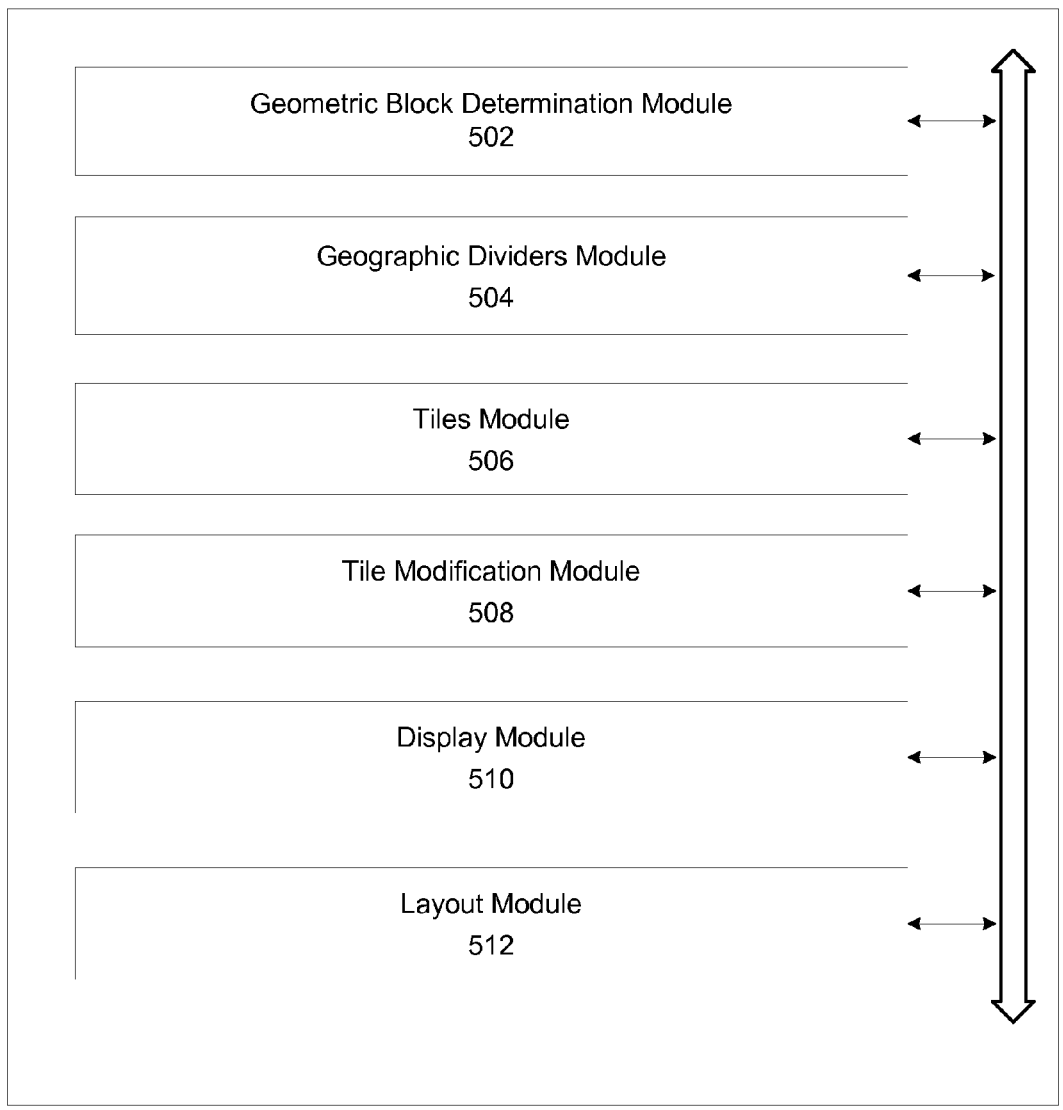
FIG. 5 conceptually illustrates an example system for tiling a map of a region.

FIG. 5 illustrates an example of system 500 for tiling a map of a region. System 500 includes a geometric block determination module 502, configured to determine a set of logical geometric blocks for the region, a geographic dividers module 504, configured to identify a plurality of linear geographic dividers for each determined logical geometric block in the region and a tiles module 506, configured to generate one or more tiles based at least on the determined logical geometric blocks and the plurality of linear geographic dividers. The system may also include a tile modification module 508, configured to split one or more of the generated tiles, when a generated tile is larger than a tile size threshold. The system may also include a display module 510, configured to display the one or more generated tiles over a map of the region, and a layout module 512, configured to compare the one or more generated tiles to a layout principle.

The tiles module 506 may be further configured to generate one or more tiles based on one or more of a region size, region population density, or region geography. The tile modification module 508 may be further configured to merge one or more of the generated tiles, when a generated tile is smaller than the tile size threshold.

These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 6:
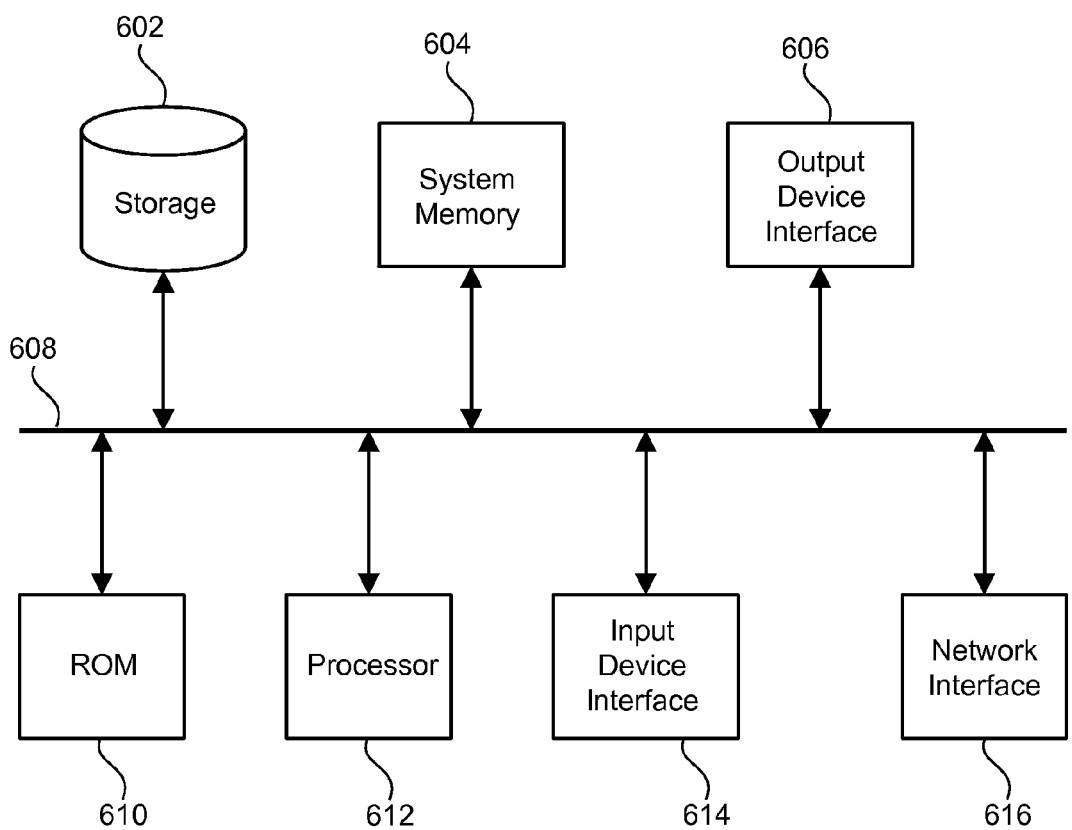
FIG. 6 conceptually illustrates an electronic system with which some aspects of the subject technology are implemented.

FIG. 6 conceptually illustrates an electronic system with which some aspects of the subject technology are implemented. Electronic system 600 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 512 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, such as televisions or other displays with one or more processors coupled thereto or embedded therein, or other appropriate computing devices that can be used for running an application. Some implementations include devices such as a touch screen that functions as both input and output devices.

Finally, as shown in FIG. 6, bus 608 also couples electronic system 600 to a network (not shown) through a network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a device having a display device, e.g., televisions or other displays with one or more processors coupled thereto or embedded therein, or other appropriate computing devices that can be used for running an application, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A computer-implemented method for tiling a map of a region, the method comprising:
    determining, by one or more computing devices, a set of logical geometric blocks for a region based on coordinates unrelated to geographical features;
    identifying, by the one or more computing devices, a plurality of linear geographic dividers for each determined logical geometric block in the region, each linear geographic divider comprising one or more existing streets, railways, electrical lines, geographical borders or bodies of water within the region;
    generating, by the one or more computing devices, one or more tiles within the determined logical geometric blocks, such that each interior border of the one or more tiles comprises at least one linear geographic divider, wherein a size of each tile is determined based at least in part on one or more population demographics associated with the region; and
    outputting, by the one or more computing devices, to a display, the one or more tiles over the map of the region.

2. The computer-implemented method of claim 1, wherein the step of generating one or more tiles comprises generating one or more tiles based on one or more of a region size, region population density, or region geography.

3. The computer-implemented method of claim 1, further comprising:
    comparing the one or more generated tiles to a tile size threshold.

4. The computer-implemented method of claim 3, wherein, in a case where a tile of the one or more generated tiles is larger than the tile size threshold, splitting the generated tile.

5. The computer-implemented method of claim 3, wherein, in a case where a tile of the one or more generated tiles is smaller than the tile size threshold, identifying another tile that is smaller than the tile size threshold and merging the tiles.

6. The computer-implemented method of claim 5, wherein the another identified tile is adjacent to the generated tile that is smaller than the tile size threshold.

7. The computer-implemented method of claim 3, wherein the tile size threshold is predetermined.

8. The computer-implemented method of claim 3, wherein the tile size threshold is determined in real time, based on an average size of the one or more generated tiles.

9. The computer-implemented method of claim 1, further comprising:
   comparing the one or more generated tiles to a layout principle.

10. The computer-implemented method of claim 1, further comprising:
    comparing the one or more generated tiles to a tile size threshold;
    generating a plurality of substantially uniform tiles from the one or more generated tiles by splitting a generated tile when the generated tile is larger than the tile size threshold, and merging adjacent generated tiles when each of the adjacent generated tiles is smaller than the tile size threshold.

11. A system for tiling a map of a region, the system comprising:
    one or more processors;
    a memory;
    a geometric block determination module comprising instructions stored on the memory that, when executed by the processor, cause the processor to determine a set of logical geometric blocks for a region based on coordinates unrelated to geographical features;
    a geographic dividers module comprising instructions stored on the memory that, when executed by the processor, cause the processor to identify a plurality of linear geographic dividers comprising one or more existing streets, railways, electrical lines, geographical borders, block borders, or bodies of water within the region for each determined logical geometric block in the region; and
    a tiles module comprising instructions stored on the memory that, when executed by the processor, cause the processor to generate one or more tiles based at least on the determined logical geometric blocks and the plurality of linear geographic dividers, such that each border of the one or more tiles comprises at least one linear geographic divider, wherein a size of each generated tile is determined based at least in part on one or more population demographics associated with the region.

12. The system of claim 11, wherein the tiles module is further configured to generate one or more tiles based on one or more of a region size, region population density, or region geography.

13. The system of claim 11, further comprising:
    a tile modification module comprising instructions stored on the memory that, when executed by the processor, cause the processor to split one or more of the generated tiles, when a generated tile is larger than a tile size threshold.

14. The system of claim 13, wherein the tile modification module is further configured to merge one or more of the generated tiles, when a generated tile is smaller than the tile size threshold.

15. The system of claim 11, further comprising:
    a display module implemented with the one or more processors that, when executed by the processor, cause the processor to display the one or more generated tiles over a map of the region.

16. The system of claim 11, further comprising:
    a layout module implemented with the one or more processors that, when executed by the processor, cause the processor to compare the one or more generated tiles to a layout principle.

17. A non-transitory machine-readable medium comprising instructions stored therein, which when executed by processors, cause the processors to perform operations comprising:
    identifying a plurality of linear geographic dividers for a region, wherein the plurality of linear geographic dividers comprises one or more of existing streets, railways, electrical lines, geographical borders, or bodies of water;
    determining a set of logical geometric blocks for the region, based on the identified plurality of linear geographic dividers; and
    generating one or more tiles based at least on the plurality of linear geographic dividers and the determined logical geometric blocks, such that each border of the one or more tiles comprises at least one linear geographic divider, wherein a size of each tile is determined based at least in part a population density associated with the region.

18. The non-transitory machine-readable medium of claim 17, the operations further comprising:
    displaying the one or more generated tiles over a map of the region.

* * * * *